(12) United States Patent
Medvinsky et al.

(10) Patent No.: US 7,913,084 B2
(45) Date of Patent: Mar. 22, 2011

(54) POLICY DRIVEN, CREDENTIAL DELEGATION FOR SINGLE SIGN ON AND SECURE ACCESS TO NETWORK RESOURCES

(75) Inventors: Gennady Medvinsky, Redmond, WA (US); Cristian Ilac, Sammamish, WA (US); Costin Hagiu, Sammamish, WA (US); John E. Parsons, Sammamish, WA (US); Mohamed Emad El Din Fathalla, Sammamish, WA (US); Paul J. Leach, Seattle, WA (US); Tarek Bahaa El-Din Mahmoud Kamel, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1300 days.

(21) Appl. No.: 11/441,588

(22) Filed: May 26, 2006

(65) Prior Publication Data

US 2007/0277231 A1 Nov. 29, 2007

(51) Int. Cl.
*H04L 9/32* (2006.01)
(52) U.S. Cl. .......... 713/168; 713/169; 713/171; 726/22; 709/229
(58) Field of Classification Search ................ 726/1, 22, 726/24; 713/159, 169, 168, 171; 709/219, 709/229
See application file for complete search history.

(56) References Cited

U.S. PATENT DOCUMENTS

| 2002/0016777 | A1 | 2/2002 | Seamons et al. ............... 705/76 |
| 2007/0210894 | A1* | 9/2007 | Park et al. ...................... 340/5.2 |
| 2008/0010377 | A1* | 1/2008 | Nissennboim ............... 709/226 |
| 2009/0055642 | A1* | 2/2009 | Myers et al. .................. 713/155 |

OTHER PUBLICATIONS

RFC 2712, "Addition of Kerberos Cipher Suites to Transport Layer Security (TLS)", Oct. 1999, Network Working Group, pp. 1-7.*

(Continued)

*Primary Examiner* — Kimyen Vu
*Assistant Examiner* — Chi Nguy
(74) *Attorney, Agent, or Firm* — Merchant & Gould, P.C.

(57) ABSTRACT

A credential security support provider (Cred SSP) is provided that enables any application to securely delegate a user's credentials from the client, via client side Security Support Provider (SSP) software, to a target server, via server side SSP software in a networked computing environment. The Cred SSP of the invention provides a secure solution that is based in part upon a set of policies, including a default policy that is secure against a broad range of attacks, which are used to control and restrict the delegation of user credentials from a client to a server. The policies can be for any type of user credentials and the different policies are designed to mitigate a broad range of attacks so that appropriate delegation can occur for given delegation circumstances, network conditions, trust levels, etc. Additionally, only a trusted subsystem, e.g., a trusted subsystem of the Local Security Authority (LSA), has access to the clear text credentials such that neither the calling application of the Cred SSP APIs on the server side nor the calling application of the Cred SSP APIs on the client side have access to clear text credentials.

19 Claims, 9 Drawing Sheets

OTHER PUBLICATIONS

RFC 4178, "The Simple and Protected Generic Security Service Application Program Interface (GSS-API) Negotiatin Mechanism", Oct. 2005, Network Working Group, pp. 1-23.*

Kagal et al., "Trust-Based Security in Pervasive Computing Environments," In: IEEE Computer, 2001, 34(12), 154-157.

Hamada et al., "A Perspective on TINA Service Security Architecture," Proceedings of WET ICE'96, 1996, 74-79.

Hess et al., "Advanced Client/Server Authentication in TLS," Computer Science Department, Brigham Young University, 2002, 12 pages.

Chinese Office Action dated Feb. 12, 2010, issued in Application No. 200780018807.6, (8 pp).

* cited by examiner

POLICY DRIVEN, CREDENTIAL DELEGATION FOR SINGLE SIGN ON AND SECURE ACCESS TO NETWORK RESOURCES

FIELD OF THE INVENTION

The present invention relates to policy driven, credential delegation for single sign on and secure access to applications, resources and/or services in a networked computing environment.

BACKGROUND OF THE INVENTION

Sometimes, a server application accessed via a client requires the credentials of a user of the client to be delegated to the server in order to support the scenarios enabled by the server application. In such a delegation situation, the password of the user of the remote terminal is required on the server side in order for the server applications to emulate the functionality that is available when a user is simply logged in as a local user of the server applications.

However, current systems for delegating credentials from a client to a server application for access to the capabilities of the server application are not secure enough, i.e., insufficient protection exists when delegating/transmitting the user's credentials from the client to the server, leaving the user's credentials vulnerable to certain forms of attack. Currently, for instance, the calling application on either the server or client side sometimes has access to the user's clear text credentials, and thus the user's credentials are somewhat insecure. In addition, there is currently no policy-driven way to control and restrict the delegation of user credentials from the client to the server that applies to any type of user credentials, i.e., username/password, smartcard pin, one time passcodes (OTP), etc.

As described in more detail below with respect to the invention, it would be desirable to improve upon these and other deficiencies of the state of the art.

SUMMARY OF THE INVENTION

In view of the foregoing, the present invention provides a credential security support provider (Cred SSP) that enables any application to securely delegate a user's credentials from the client, via client side Security Support Provider (SSP) software, to a target server, via server side SSP software in a networked computing environment. In one embodiment, the Cred SSP is made available to the user via Security Support Provider Interface (SSPI) software, which may be included as part of an operating system of the client. The Cred SSP of the invention provides a secure solution that is based in part upon a set of policies, including a default policy that is secure against a broad range of attacks, which are used to control and restrict the delegation of user credentials from a client to a server. The policies can be for any type of user credentials and the different policies are designed to mitigate a broad range of attacks so that appropriate delegation can occur for given delegation circumstances, network conditions, trust levels, etc. Additionally, only a trusted subsystem, e.g., a trusted subsystem of the Local Security Authority (LSA), has access to the clear text credentials such that neither the calling application of the SSPI APIs using the Cred SSP on the server side nor the calling application of the SSPI APIs using the Cred SSP on the client side have access to clear text credentials.

Other features of the present invention are described below.

BRIEF DESCRIPTION OF THE DRAWINGS

The policy driven, credential delegation for single sign on and secure access to resources in a networked computing environment are further described with reference to the accompanying drawings in which.

DETAILED DESCRIPTION OF ILLUSTRATIVE EMBODIMENTS

Overview

Figure 1:
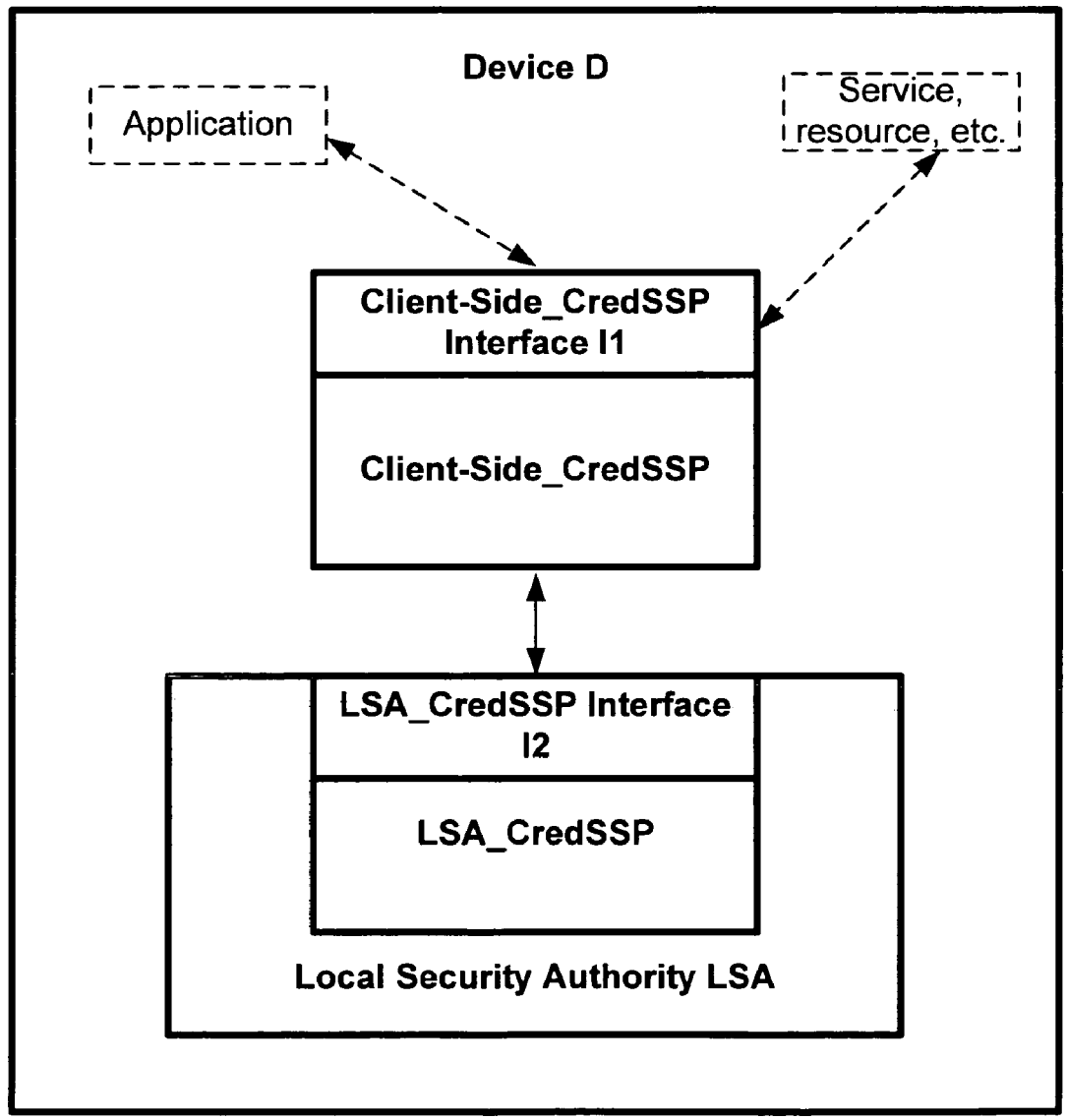
FIG. 1 is a block diagram overview of the credential security support provider architecture of the invention that enables the secure delegation of credentials from client to server.

As mentioned in the background, there are some client/server applications that require the user's credentials to be delegated to the server in order to support the server scenarios. Terminal Server is one such example where sometimes the user's password is used on the server side in order to emulate its functionality on the client side. However, as mentioned, prior art delegation techniques do not provide sufficient protection to the user's credentials when sent to the server.

The Cred SSP of the invention is a new "security support provider," sometimes also referred to as a "security service provider," that may be made available via existing Security Support Provider Interface (SSPI) infrastructure of an operating system of the client. The Cred SSP of the invention enables an application to delegate the user's credentials from the client, e.g., via client side SSP software, to the target server, e.g., via server side SSP software. In an exemplary, non-limiting embodiment, the Cred SSP of the invention may be included in Terminal Server. However, the Cred SSP of the invention may be utilized by other applications, and may be made available to any internal or third party application using the SSPI of the applicable operating system.

The Cred SSP solution is a more secure solution that provides a set of policies that can be used to control and restrict the delegation of user credentials from the client to the server. The policies are designed to address a broad range of attacks, including malware running on the client's machine. The Cred SSP of the invention includes a "secure by default" policy, which is the particular configuration via the policy settings that enables a client machine, by default, to mitigate a broad range of attacks. The set of policies of the invention are applicable to protecting any type of user credentials, including, but not limited to username/password, smartcard pin, one time passcodes (OTP), etc. The Cred SSP of the invention protect the user's credentials such that the calling application (of the Cred SSP API) on the server or client side does not have access to clear text credentials, because only a trusted subsystem has access to clear text credentials.

Microsoft's Terminal Server (TS), for instance, is an example of a server/client product that sometimes requires users to provide sign on credentials at the terminal/client, and delegate those sign on credentials to the server in order to authorize the serving of applications and the "desktop" experience of Microsoft's Windows operating systems products to the terminal/client. TS can be thought of as generally including three main parts: a multi-user core server, the Remote Desktop Protocol (RDP) that enables the Windows desktop interface to be sent to the terminals by the server, and the client software that executes on each terminal. In one non-limiting embodiment of the invention, the protocols of the credential security support provider of the invention may be implemented in connection with terminal server software.

Supplemental Context

Some of the various embodiments are described herein with reference to terms that are generally understood by those of ordinary skill in the authentication and credentials delegation arts. While this section is not intended to substitute for the knowledge of those of ordinary skill in the art and is to be considered a non-exhaustive overview, nonetheless, this section is believed to advantageously provide some additional context and background for certain terms, which are utilized in the context of the operation of various embodiments of the invention, as described in more detail below.

Additional context and background for the following terms generally known by those of ordinary skill in the art is thus provided herein: Kerberos, Windows NT Local Area Network (LAN) Manager (NTLM), Simple and Protected Generic Security Service Application Program Interface (GSSAPI) Negotiation Mechanism (SPNEGO for short), Local Security Authority (LSA), Security Support Provider Interface (SSPI) and Secure Sockets Layer (SSL) protocol and an exemplary Windows Authentication Infrastructure.

Kerberos

Kerberos is a secure method for authenticating a request for a service in a computer network. Borrowing its name from the mythological three-headed dog that guards the entrance to Hades, Kerberos lets a user request an encrypted "ticket" from an authentication process that can then be used to request a particular service from a server, such that the user's password does not have to pass through the network. Kerberos includes client and server side software that allows access to a server including a login request at a client by a user. The server, however, requires a Kerberos "ticket" before it honors the request for access to its applications, resources and/or services. To obtain the proper Kerberos ticket, an authentication request is made by the client to an Authentication Server (AS). The AS creates a "session key," which is also an encryption key, basing the session key on the user's password obtained from the user name, and a random value that represents the requested service. In this sense, the session key is effectively a "ticket-granting ticket."

Next, the ticket-granting ticket obtained is transmitted to a ticket-granting server (TGS). The TGS may be physically the same server as the AS, but functionally performs a different service. The TGS returns the ticket that can be sent to the server for the requested service. The service either rejects the ticket if the ticket is invalid, or accepts the ticket as a valid ticket and performs the service. Because the ticket received from the TGS is time-stamped, the ticket allows additional requests using the same ticket within a certain time period without having to re-authenticate the user's use of the service of the server. On the other hand, making the ticket valid for a limited time period makes it less likely that someone other than the authorized user will be able to re-use the ticket. One of ordinary skill in the art can appreciate that the particulars of the Kerberos authentication process at the interface, protocol, payload and driver levels can be much more complicated and that the user procedure may vary somewhat according to implementation.

Windows NT LAN Manager (NTLM)

An alternative to Kerberos, NTLM is an authentication protocol used in various Microsoft network protocol implementations and supported by the NTLM Security Support Provider (NTLMSSP). Originally used for authentication and negotiation of secure Distributed Computing Environment (DCE)/Remote Procedure Call (RPC) communications, NTLM is also used as an integrated single sign-on mechanism.

NTLM employs a challenge-response mechanism for authentication, in which clients are able to prove their identities without sending a password to the server. The challenge-response mechanism includes three messages, commonly referred to as Type 1 (negotiation), Type 2 (challenge) and Type 3 (authentication). At a high level, with NTLM, first, a client sends a Type 1 message to the server including a list of features supported by the client and requested of the server. The server responds with a Type 2 message to the client including a list of features supported and agreed upon by the server and a challenge generated by the server. The client replies to the challenge with a Type 3 message with several pieces of information about the client including the domain and username of the client user and one or more responses to the Type 2 challenge. The response(s) in the Type 3 message are an important piece as they prove to the server that the client user has knowledge of the account password.

Secure Channel (Schannel)

Secure Channel, also known as Schannel, is a security support/service provider (SSP) containing a set of security protocols that provide identity authentication and enhanced communication security through encryption. Schannel is primarily used for Internet applications that require enhanced security for Hypertext Transfer Protocol (HTTP) communications. Server authentication, where the server provides proof of its identity to the client, is required by the Schannel security protocols. Thus, Schannel protocols utilize Schannel credentials that can be used to authenticate servers and, optionally, clients. Client authentication may be requested by the server at any time. Schannel credentials are X.509 certificates. Public and private key information from certificates is used to authenticate the server and, optionally, the client. These keys are also used to provide message integrity while the client and the server exchange the information required to generate and exchange session keys. Schannel implements the SSL and TLS protocols referred to in more detail below.

Simple and Protected GSSAPI Negotiation Mechanism (SPNEGO)

SPNEGO is a standard Generic Security Service Application Program Interface (GSSAPI) pseudo-mechanism for peers to determine which GSSAPI mechanisms are shared, select one and then establish a security context with the shared GSSAPI mechanism. The specification for SPNEGO may be found at the Internet Engineering Task Force's Draft RFC 2478, entitled, "GSS-API Negotiation Mechanism," dated December 1998.

SPNEGO's use may be found, for instance, in the "HTTP Negotiate" extension, which is an authentication extension that was first implemented in browsing software Internet Explorer and which provided single sign-on capabilities known as Windows Integrated Authentication. Negotiable sub-mechanisms of SPNEGO include NTLM and Kerberos, which may both use Active Directory.

The GSSAPI provides a generic interface which can be layered atop different security mechanisms, such that if communicating peers acquire GSSAPI credentials for the same security mechanism, then a security context may be established between them. However, GSSAPI doesn't prescribe the method by which GSSAPI peers can establish whether they have a common security mechanism.

SPNEGO enables GSSAPI peers to determine in-band whether their credentials share common GSSAPI security mechanism(s), and if so, to invoke normal security context establishment for a selected common security mechanism, allowing the negotiation of different security mechanisms, different options within a given security mechanism, or different options from several security mechanisms. This is most useful for applications that are based on GSSAPI implementations which support multiple security mechanisms. Once the common security mechanism is identified, the security mechanism may also negotiate mechanism-specific options during its context establishment.

With SPNEGO, the negotiation data is encapsulated in context-level tokens. Thus, callers of the GSSAPI do not need to be aware of the existence of the negotiation tokens, but only of the pseudo-security mechanism.

The negotiation model of SPNEGO works as follows: the initiator proposes one security mechanism or an ordered list of security mechanisms, and the target either accepts the proposed security mechanism, or chooses one from an offered set, or rejects the proposed value(s). The target then informs the initiator of its choice.

In its basic form, this protocol requires an extra-round trip. Network connection setup is a critical performance characteristic of any network infrastructure and extra round trips over WAN links, packet radio networks, etc. can really make a difference. In order to avoid such an extra round trip, the initial security token of the preferred mechanism for the initiator may be embedded in the initial token. If the target preferred mechanism matches the initiator's preferred mechanism, no additional round trips are incurred by using the negotiation protocol.

SPNEGO also provides a technique to protect negotiation when the underlying mechanism selected by the target is capable of integrity protection. When all the mechanisms proposed by the initiator support integrity protection or when the selected mechanism supports integrity protection, then the negotiation mechanism becomes protected since this guarantees that the appropriate mechanism supported by both peers has been selected.

Local Security Authority (LSA)

While a generalized concept, the LSA is a key component of the logon process for Microsoft's Windows operating system technologies being responsible for validating users for both local and remote logons. The LSA also maintains the local security policy.

During a local, interactive, logon to a machine, a person enters their name and password to the logon dialog. This information is passed to the LSA, which then calls the appropriate authentication package. The password is sent in a non-reversible secret key format using a one-way hash function. The LSA then queries the Security Account Manager (SAM) database for the user's account information. If the key provided matches the one in the SAM, the SAM returns the user's Security Identifier (SID) and the SIDs of any groups to which the user belongs. The LSA then uses these SIDs to generate security access token(s). This description applies in the case of a user having a local account, as opposed to a domain account where a Kerberos service ticket is obtained to authenticate the user to the machine.

Security Support Provider Interface (SSPI)

The SSPI defines the mechanics of authenticating a user, i.e., verifying that the user is who the user claims to be, or at the very least, that the user knows a secret, e.g., the password, associated with a particular user account.

The credentials used for such an authenticated connection can be: (1) the credentials for an existing authenticated link between the client and server machines (e.g., an existing drive mapping), (2) the credentials for the client user's account, if the server recognizes the SID associated with this account; this implies that both client and server trust the same domain, and that the user account is from that domain, (3) the raw credentials (e.g., name and password) for a local account on the server if it matches both the client user's name and password (in this case, the client user's account and the account he uses on the server are distinct) and (4) the credentials (e.g., name and password) that are explicitly passed in by the user. SSPI works by asking the calling applications (the client and server processes) to transmit data blocks back and forth until the underlying security provider is satisfied.

Having loaded the security dynamic link library (DLL) and having selected a package (another term for security provider, such as NTLM, Kerberos, etc.), the client initializes the local or client SSPI and retrieves the first set of data to send to the server. Meanwhile, the server has initialized the server SSPI and after receiving the first set of data, the server feeds it to the server SSPI, which processes the first set of data resulting in a second set of data. On return, the server performs a check against the resulting second set of data and if the data is greater than 0, the server sends the second set of data to the client, which in turn feeds it to the client SSPI. The client SSPI then either requests that a third set of data be sent to the server, or tells the application that authentication is complete. This continues until both the client and server SSPIs are satisfied with the data received from the other.

At this point, the server holds a context handle, which (among other things) can be queried for the user name of the client. Depending on the options used by the client, the server may also be allowed to use the context to impersonate the client, to sign or encrypt messages, and so on. There is one more, optional, step that may be performed. To end the send-receive cycle, some security providers may request a predefined finishing step called CompleteAuthToken(CAT).

Secure Sockets Layer (SSL) and Transport Layer Security (TLS) Protocols

The Secure Sockets Layer (SSL) protocol and Transport Layer Security (TLS) protocol, its successor, both implemented by Schannel, are cryptographic protocols which provide secure communications on the Internet. There are slight differences between SSL 3.0 and TLS 1.0, but the protocol remains substantially the same. The term "SSL" sometimes refers to both protocols unless clarified by context.

SSL/TSL protocols provide endpoint authentication and communications privacy over the Internet using cryptography. In typical use, the server is authenticated (i.e., its identity is ensured) while the client remains unauthenticated, though mutual authentication may be performed via public key infrastructure (PKI) deployment to clients. The protocols allow client/server applications to communicate in a way designed to prevent eavesdropping, tampering, and message forgery.

Exemplary Non-Limiting Windows Authentication Infrastructure

One exemplary, non-limiting authentication infrastructure is provided by Windows operating systems technologies that support different authentication methods via the Security Service/Support Provider (SSP) software.

In one implementation, Windows supports three primary SSPs described above: Kerberos, NTLM Challenge/Response and SChannel Security Protocols. While Kerberos is the default authentication method in Windows 2000, other methods can be used through the Security Support Provider Interface, or SSPI. In addition, for example, Windows can use the following network SSPs to provide authentication services using digital certificates: Distributed Password Authentication (DPA)—an Internet authentication protocol, Extensible Authentication Protocol (EAP)—an extension to Point-to-Point (PPP) protocol and Public key-based protocols, including SSL, TLS and Private Communication Technology.

Policy Driven, Credential Delegation for Single Sign on and Secure Access to Network Resources As mentioned, the invention provides enhanced credential security support provider (Cred SSP) software that enables an application to delegate the user's credentials from the client, e.g., via client side SSP software, to the target server, e.g., via server side SSP software. The Cred SSP of the invention may be utilized by any native application of an operating system or any third party application using the applicable SSPI, e.g., an SSPI integrated with an operating system application platform.

FIG. 1 is a block diagram overview of the Cred SSP architecture of the invention that enables the secure delegation of credentials from client to server, without exposing the clear text credentials to the calling application(s). In one embodiment, the Cred SSP is implemented as a set of two packages: a client (or application) side CredSSP package Client-Side_CredSSP and an LSA side CredSSP package LSA_CredSSP of a device D, for either a client computing device or server computing device.

The Client-side package Client-side_CredSSP is client side security support provider software that is exposed to callers of the client side Security Support Provider Interface Client-side_CredSSP Interface I1, provides Schannel negotiation and exposes the Schannel package functionality, as well as communication with the LSA side package LSA_CredSSP via LSA-side CredSSP Interface I2. In accordance with the invention, handling Schannel negotiation and functionality in a user process facilitates faster encryptMessage and decryptMessage operations as compared to performance by the LSA.

In accordance with the invention, the LSA package LSA_CredSSP provides the SPNEGO negotiation and credential encryption/decryption and credential forwarding, as well as performs the policy checks against the policies defined in accordance with the above-described set of policies of the invention.

Figure 2A:
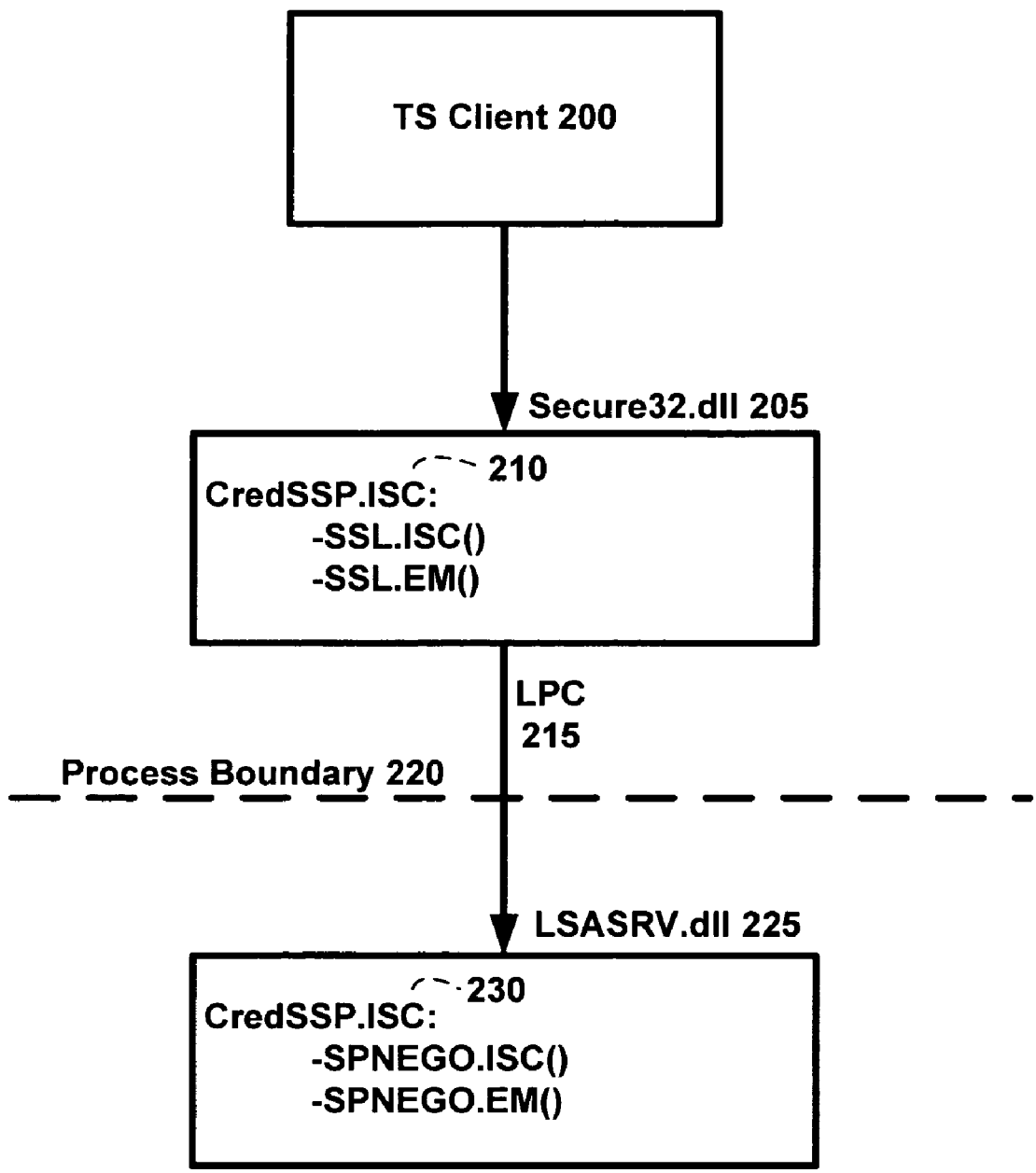
FIGS. 2A and 2B illustrate an exemplary, non-limiting implementation of the credential security support provider architecture for delegating credentials to a terminal server.
Figure 2B:
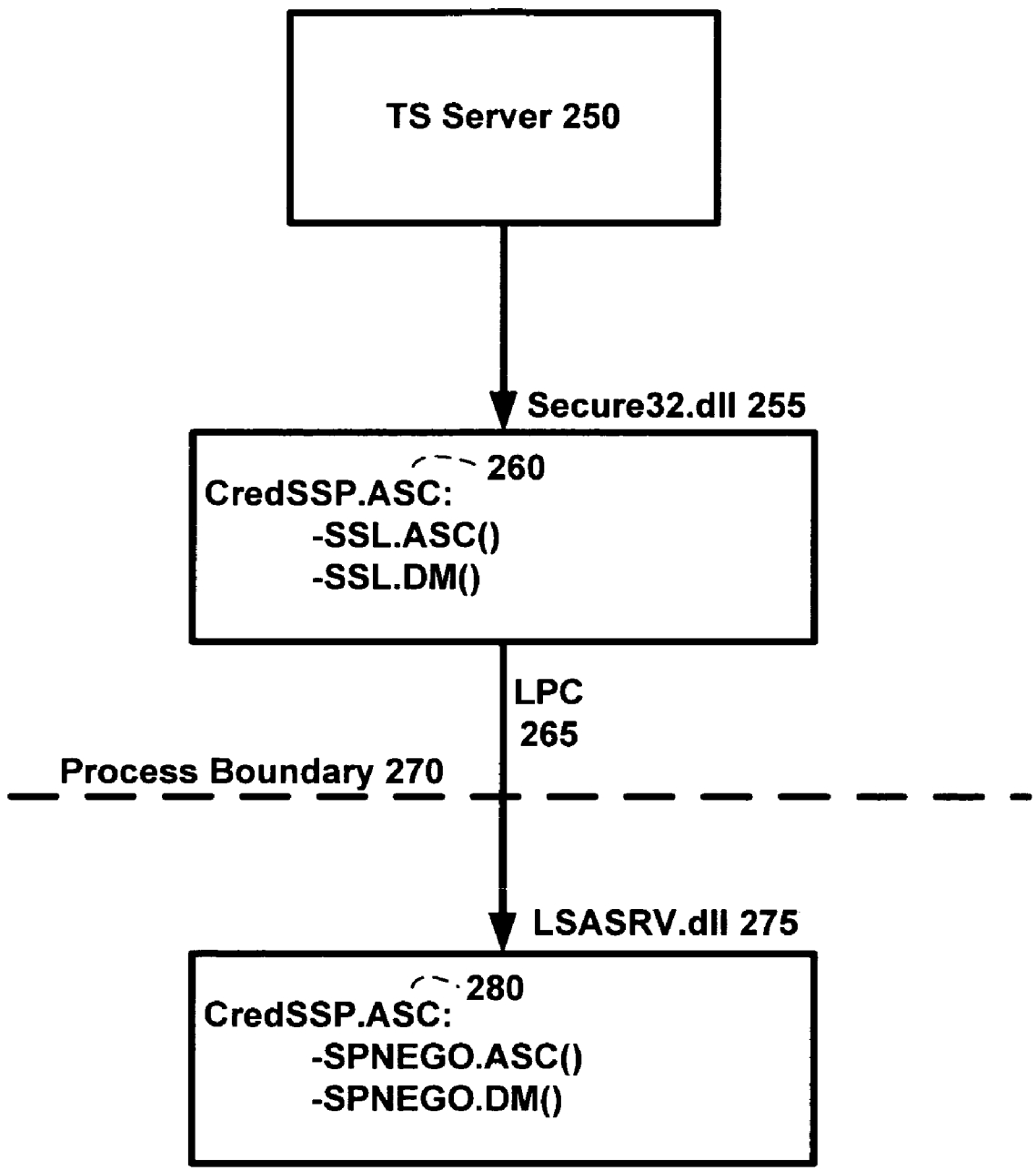

As mentioned, and as shown in FIGS. 2A and 2B in an exemplary, non-limiting embodiment, the invention is implemented in connection with a terminal server client 200 delegating credentials to a terminal server 250.

As shown in FIG. 2A, an implementation of a terminal server client 200 interacts with LSA Server process 225 via secure authentication library 205 utilizing a local procedure call (LPC) 215 that includes transmitting data across process boundary 220. Functions 210 execute in secure authentication library 205 and may include a CredSSP Initialize Security Context (CredSSP.ISC) function that includes a Secure Sockets Layer/Initialize Security Context (SSL.ISC) function and a Secure Sockets Layer/Encrypt Message (SSL.EM) function. Functions 230 executes in LSA Server process 225 and may include a CredSSP Initialize Security Context (CredSSP.ISC) function that includes a SPNEGO/Initialize Security Context (SPNEGO.ISC) function and a SPNEGO/Encrypt Message (SPNEGO.EM) function.

As shown in FIG. 2B, an implementation of a terminal server 250 interacts with LSA Server process 275 via secure authentication library 255 utilizing a local procedure call (LPC) 265 that includes crossing process boundary 270. Functions 260 executes on secure authentication process 205 and may include a CredSSP Accept Security Context (CredSSP.ASC) function that includes a Secure Sockets Layer/Accept Security Context (SSL.ASC) function and a Secure Sockets Layer/Decrypt Message (SSL.DM) function. Functions 280 execute in LSA Server process 275 and may include a CredSSP Accept Security Context (CredSSP.ASC) function that includes a SPNEGO/Accept Security Context (SPNEGO.ASC) function and a SPNEGO/Decrypt Message (SPNEGO.DM) function.

Figure 3:
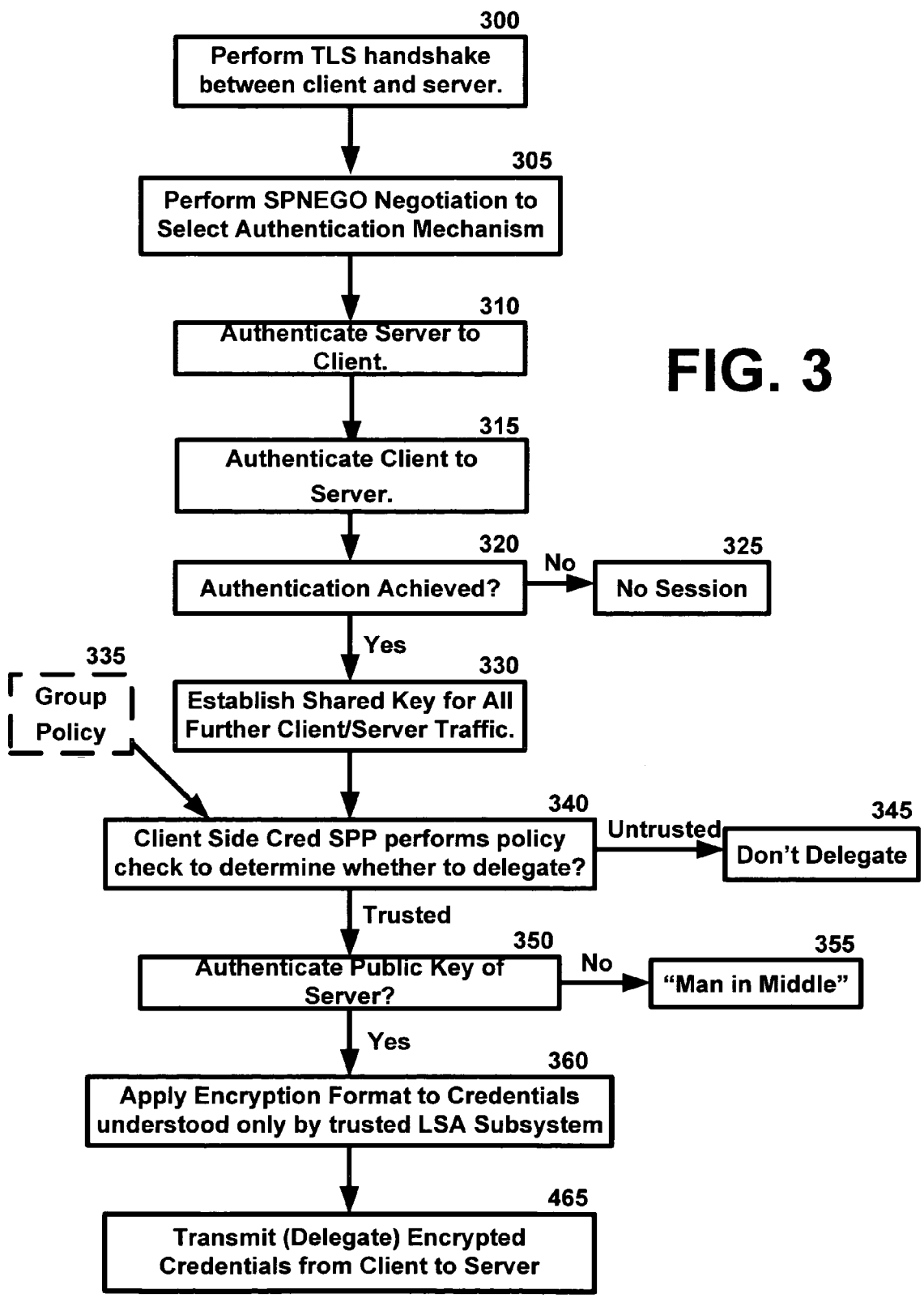
FIG. 3 is a flow diagram of an exemplary, non-limiting protocol utilized by the credential security support provider architecture of the invention.

An exemplary, non-limiting protocol utilized by the Cred SSP of the invention is shown in exemplary fashion in the flow diagram of FIG. 3. At 300, an initial SSL/TLS handshake takes place between a client and a server. At 305, SPNEGO negotiation occurs to select an authentication mechanism (e.g., Kerberos or NTLM, or other suitable negotiation mechanism understood by client and server). At 310 and 315, using the negotiated authentication mechanism, the server is authenticated to the client, and the client is authenticated to the server.

If, at 320, appropriate authentication has been achieved between client and server according to steps 310 and/or 315, then a shared secret (e.g., a shared key) is established for all further traffic at 330. However, advantageously, if, at 320, appropriate authentication has not been established between client and server, then no session is created at 325, and much computational expense and traffic is avoided. In the past, e.g., for past implementations of terminal server, authentication was performed more expensively because the attempt to perform authentication was started after a session was created. In contrast, in accordance with the protocol of the Cred SSP of the invention, the session between client and server is not created unless authentication of client and server according to the SPNEGO selected authentication mechanism is achieved.

Thus, assuming at 320 that appropriate authentication has been performed using the selected authentication mechanism, a shared key is established for all further traffic between client and server at 330. However, just because threshold authentication has occurred does not yet mean that the server is necessarily trusted by the client. Thus, at this point, while a session has been created between client and server, the server may be considered trusted or untrusted. Accordingly, using group policy 335 of the invention, the LSA Cred SSP on the client machine performs a policy check at 340 to determine whether to delegate the user credentials. If the server is not to be trusted, then at 345, the credentials are not delegated. If the server relationship is trusted per the policy check of 340, then at 350, the public key of the server is authenticated to help avoid "man-in-the-middle" attacks, where a rogue software object mimics the behavior and public key of the server. Thus, if the public key of the server is not authenticated at 350, then the credentials are not delegated according to risk of man in the middle attack at 355. At 360, an encryption format is applied to the credentials that is understood only by a trusted subsystem of the LSA. At 465, the encrypted credentials are delegated from the client to the server. By making the encryption format understood only by a trusted subsystem of the LSA, advantageously, the calling applications on the client and server to the LSA and Cred SSP of the invention do not have improper access to clear text credentials.

Figure 4:
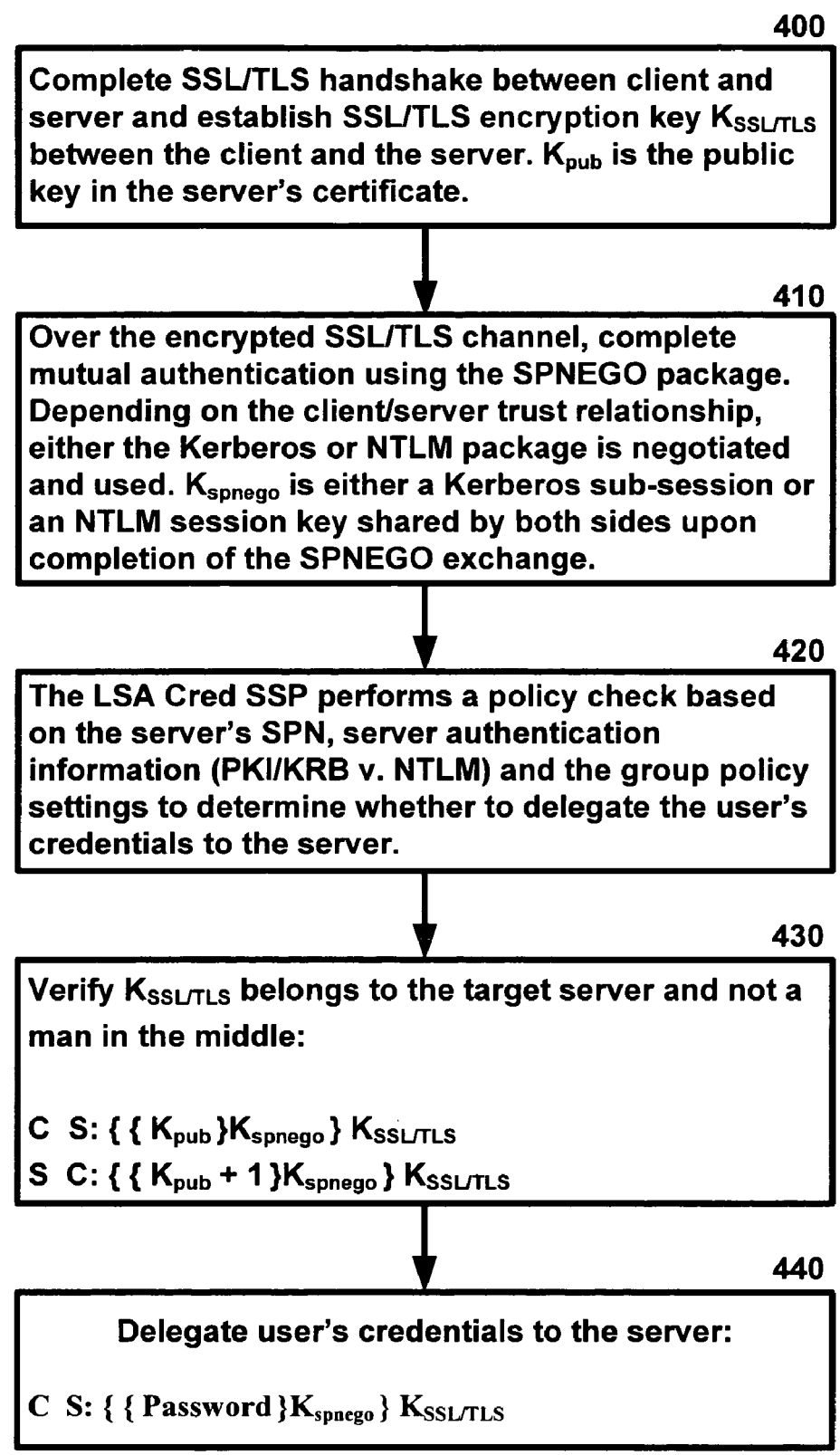
FIG. 4 is a flow diagram of an exemplary, non-limiting implementation of a protocol utilized by the credential security support provider architecture of the invention.

FIG. 4 illustrates a more detailed implementation of the credential delegation protocol of the invention as an exemplary, non-limiting flow diagram. At 400, a SSL/TLS handshake is completed between client and server, and SSL/TLS encryption key $K_{SSL/TLS}$ is established between the client and the server. $K_{pub}$ is the public key in the server's certificate. Then, at 410, over the encrypted SSL/TLS channel, mutual authentication of the client and server is completed using the SPNEGO package. Depending on the client/server trust relationship, either the Kerberos or NTLM package is negotiated and used. It is noted that in case NTLM is negotiated, the server proves knowledge of the password to the client, but other servers in the same domain have access to the password. $K_{spnego}$ is either a Kerberos sub-session or an NTLM session key shared by both sides upon completion of the SPNEGO exchange.

At 420, the LSA Cred SSP on the client machine performs a policy check based on the server's service principal name (SPN), server authentication info (PKI/KRB vs. NTLM) and the group policy settings to determine whether to delegate the user's credentials to the server. Then, at 430, it is verified that $K_{SSL/TLS}$ belongs to the target server and not a man in the middle by performing the following exemplary authentication exchange:

C→S: $\{\{K_{pub}\}K_{spnego}\}\ K_{SSL/TLS}$
S→C: $\{\{K_{pub}+1\}K_{spnego}\}\ K_{SSL/TLS}$ It is noted that $K_{SSL/TLS}$ is used to encrypt all client/server communication. Furthermore, this server authentication step may be based on Kerberos or NTLM, if there is no PKI based trust. The secure binding of the SSL/TLS authenticated channel to the Kerberos based authentication, as described, may be carried out on top of SSL/TLS. Stated differently, the invention may securely utilize Kerberos based credentials to authenticate a SSL/TLS negotiated master/session key, which can be particularly useful if there is no PKI trust between the SSL/TLS client and SSL/TLS server.

Finally, at 440, the user's credentials (e.g., password) may be delegated to the server in a manner that prevents clear text credential review except by the trusted LSA subsystem of the invention according to the following symbolic data exchange:

C→S: $\{\{Password\}K_{spnego}\}\ K_{SS/TLS}$

As described above, for instance, in steps 340 (and group policy 335) and 420 of FIGS. 3 and 4, respectively, policies are utilized to control and restrict the delegation of the client's credentials in accordance with the invention to mitigate a broad range of security attacks. As mentioned, the LSA package of the invention provides SPNEGO negotiation, credential encryption/decryption and credential forwarding. The LSA package of the invention also performs policy checks against policies defined in accordance with the invention. The purpose of the group policy settings of the invention is to ensure that the user's credentials are not delegated to an unauthorized server, e.g., a machine under the administrative control of a rogue or subject to an attacker. It should be noted that, while trust may exist to facilitate authentication between the client and server, e.g., based on PKI, Kerberos or NTLM authentication, such trust does not mean that the target server is trusted with the user's credentials. Thus, the invention includes a policy consultation to ensure that the target server can be trusted with the delegated credentials.

Figure 5:
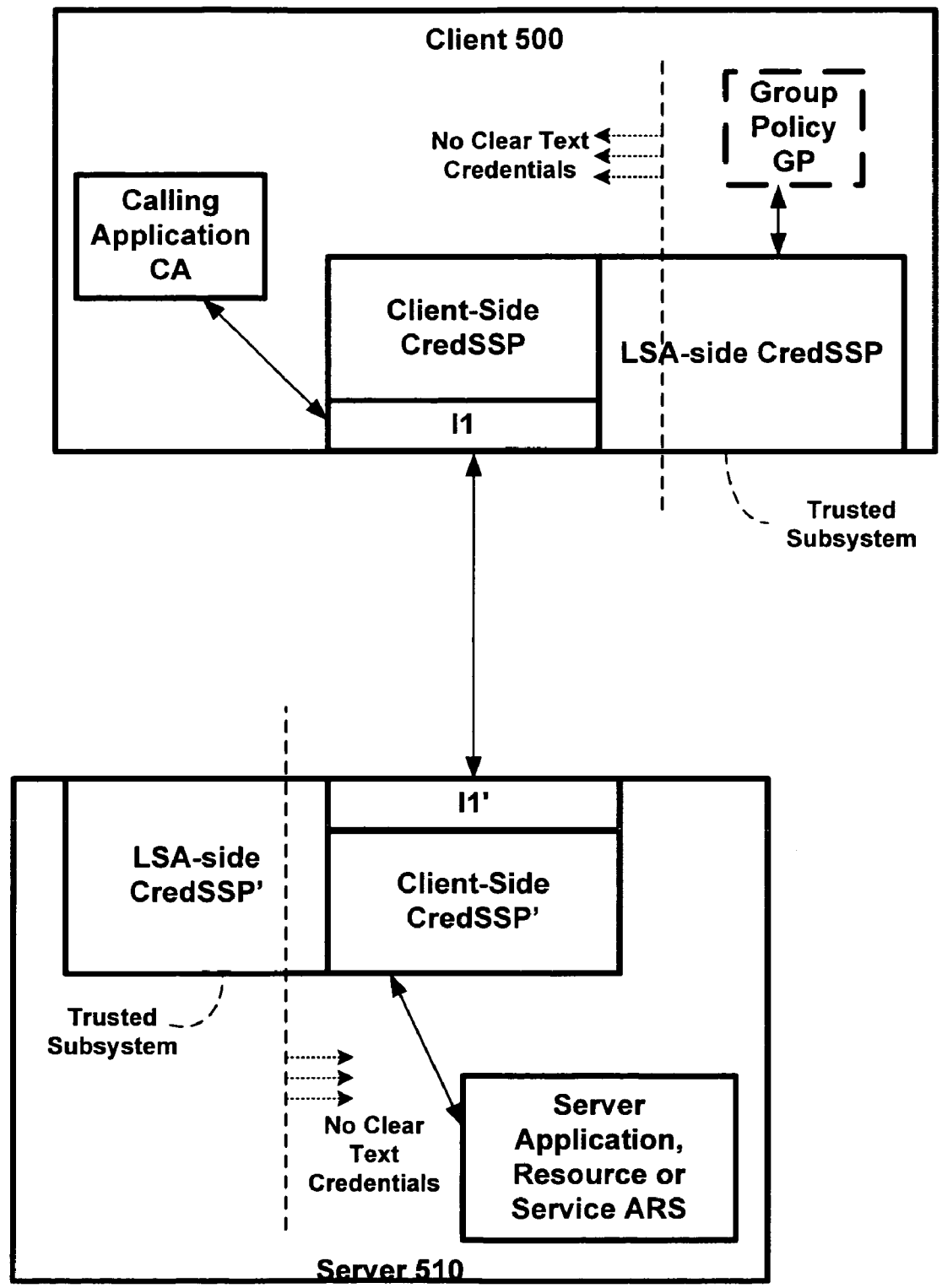
FIG. 5 is a block diagram overview of the credential security support provider architecture that enables the secure delegation of credentials from client to server based on group policy in accordance with the invention.

FIG. 5 is an exemplary, non-limiting block diagram of the Cred SSP architecture of the invention that enables the secure delegation of credentials from client to server, without exposing the clear text credentials to the calling application(s). Similar to FIG. 1, the Cred SSP is implemented as a set of two packages on both client C and server S: a client side package and an LSA side package. On client C, this translates to Client-side CredSSP and LSA-side CredSSP. On Server S, this translates to Client-side CredSSP' and LSA-side CredSSP'. FIG. 5 illustrates that in accordance with the invention, the user's clear text credentials are never stored or accessible to the calling application CA of a client 500 requesting a server application, resource or service ARS of a server 510. The dotted line segmenting a trusted subsystem portion of the LSAs shows that only the trusted subsystem portion of the LSAs have access to the user's clear text credentials, i.e., the ability to decrypt/encrypt. In addition, FIG. 5 illustrates the LSA-side CredSSP on the client machine consults the group policies GP of the invention, as described in more detail below.

In this regard, the group policy settings, shown below in Table III, define which servers are trusted with the user's credentials, where each setting is a list of service principal names (SPNs); in one embodiment, wild cards are allowed. As one of ordinary skill in the string recognition arts can appreciate, wildcards refer to characters, such as '*', which can stand for any character or string permissible in an alphabet of SPNs. Thus, according to the invention, the Cred SSP (client side) only delegates the user's credentials if the server is authenticated to the client and the server's SPN passes a policy check, e.g., as defined by the group policy (GP) settings shown in the Table III below.

The policy settings for delegating user credentials defined below in Table III are designed to mitigate a variety of attacks, including but not limited to, the attacks listed in Table I:

TABLE I

Types of Attacks Policy Settings Mitigate

1 A Trojan or malware may be running on the client machine, e.g., in Limited User Access (LUA) mode, not admin.
2 Default GP settings vs. other GP values that may be configured by administrator (including misuse of wild cards).
3 Domain Name Service (DNS) poisoning. When the client resolves the host name, it may be communicating with a rogue server.
4 Denial of service attacks on the Kerberos Key Distribution center (KDC).

Figure 6:
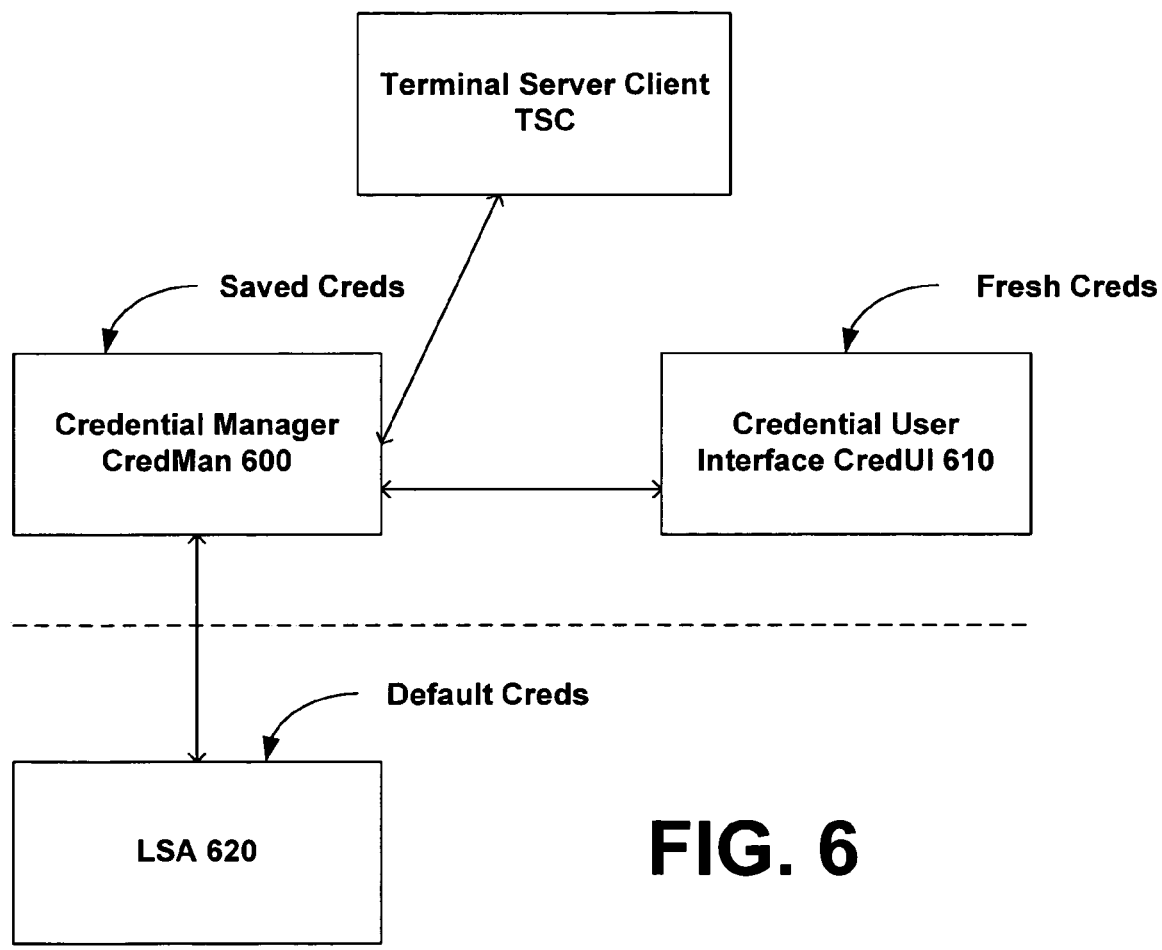
FIG. 6 is a block diagram overview of three different types of credentials that may be considered at a policy level according to threat of attack in accordance with the invention.

The decision made as to which of the policies defined in accordance with the invention (defined in exemplary, non-limiting fashion in Table III below) applies to a given situation depends upon the authentication protocol negotiated between the client and the server, as described above in connection with FIGS. 3 through 5 and the type of credentials. FIG. 6 shows three exemplary types of credentials upon which policy may be based in accordance with the invention, including Fresh Credentials, Default Credentials and Saved Credentials. Fresh credentials are credentials that are input in real-time via a credential user interface, such as CredUI 610. Saved credentials are credentials that have been input formerly as fresh credentials, and which are stored for additional re-use by a credential manager, such as CredMan 600, e.g., for a limited period of time. Saved credentials are considered weaker from a security standpoint than fresh credentials. Even less secure are default credentials, which as the name implies are default credentials that are designated for use by the LSA 620 in the absence of other instructions to use other credentials. For instance, Default credentials may include credentials entered at log on time. Default credentials may be alright for certain circumstance, which do not require elevated security, such as certain Web site credentials. Also, while less secure, default credentials have the advantage of being immediately available to LSA 620. Thus, there are three type of credentials that may be utilized in connection with a request by a terminal server client TSC as shown in FIG. 6. Table II sets forth the three types of credentials considered in this exemplary, non-limiting embodiment: Fresh, Saved and Default.

TABLE II

Types of Credentials

| | |
|---|---|
| Fresh Credentials | User's credentials collected via user interface, such as CredUI, and passed directly to SSPI (e.g., passed in into AcquireCredentialsHandle call). |
| Default Credentials | Credentials that were initially provided by the user when the user first signed on to the system (available to SSPs). |
| Saved Credentials | Credentials for a particular target server that the user elected to save in the credential manager (e.g., CredMan). |

As referred to above, Table III below includes an exemplary non-limiting set of group policy (GP) settings for controlling/restricting the delegation of user credentials by a client to a server in accordance with the invention. As one of ordinary skill in the computer networking arts can appreciate, Termsrv/* stands for a set of SPNs where the service is Termsrv and the host machine named after the forward slash "/" can be any target server matching the * wildcard.

TABLE III

Group Policy Settings for Controlling/Restricting Delegation of User Credentials

| # | GP Setting (List of SPNs) | Default value | comments |
|---|---|---|---|
| 1 | AllowDefCredentials Meaning: Password may be passed to listed targets when authenticating with default credentials. | NULL | Default setting: By default, delegation of default credentials (those entered when the user first signed on) is not permitted to any machine. This means that malware running on the client machine (in LUA mode) will not be able to delegate default credentials by calling into the Cred SSP (regardless of all other factors, i.e., authentication scheme) since the policy check will fail. |
| 2 | AllowSavedCredentials Meaning: Password may be passed to listed targets when authenticating with saved credentials | Termsrv/* | Default setting: The default value permits the delegation of the user's saved credentials to the terminal service running on any machine. It should be noted that this applies to servers that the user previously logged into and elected to save his credentials in CredMan. (Target server name is stored along with the user's credentials in CredMan). |
| 3 | AllowFreshCredentials Meaning: Password may be passed to target when authenticating with fresh credentials | Termsrv/* | By comparison to the above settings, with AllowFreshCredentials, there is no possibility of malware performing a silent login (without the user first being prompted, assuming AllowSavedCredentials & AllowDefCredentials policy settings are not enabled) |
| 4 | DenyDefCredentials Meaning: Password may not be passed to listed targets when authenticating with default credentials | NULL | This setting is used to further restrict to which servers the user's default credentials can be delegated, and by itself does not offer an opportunity for exploit. However, the administrator should still exercise caution when constructing a policy for default credentials via the combination of DenyDefCredentials & AllowDefCredentials settings. If AllowDefCredentials covers a wide set of servers, the list of exceptions expressed via DenyDefCredentials may not comprehensively cover all untrusted servers in a given environment. This can become a particular issue over time, as new servers come online. Additionally, malware with administrative privileges can remove untrusted servers from the DenyDefCredentials list. However, |

TABLE III-continued

Group Policy Settings for Controlling/Restricting Delegation of User Credentials

| # | GP Setting (List of SPNs) | Default value | comments |
|---|---|---|---|
| | | | malware with administrative privileges is a "game over" condition since there are a number of ways to obtain the user's password in such a case. |
| 5 | DenySavedCredentials Meaning: Password may not be passed to listed targets when authenticating with saved credentials | NULL | This setting is used to further restrict to which servers the user's saved credentials can be delegated, and by itself does not offer opportunity for exploit. |
| 6 | DenyFreshCredentials Meaning: Password may not be passed to listed targets when authenticating with fresh credentials | NULL | This setting is used to further restrict to which servers the user's fresh credentials can be delegated, and, by itself, does not offer opportunity for exploit. |
| 7 | AllowDefCredentialsWhen NTLMOnly Meaning: If the only authentication package is NTLM, and user authenticates with default credentials, allow the password to be passed to the listed targets. | NULL | By default, this setting is off since Kerberos and PKI based trust offers stronger authentication methodology than NTLM. |
| 8 | AllowSavedCredentials WhenNTLMOnly Meaning: If the only authentication is NTLM, and user authenticates with saved credentials, allow the password to be passed to the listed targets. | Termsrv/* (unjoined) NULL (joined) | To cope with the inherent weakness in the NTLM protocol, delegation of user credentials is allowed by default only with domain unjoined machines (in this case, server authentication is ensured to be achieved by the target stand alone machine). By default, for the domain joined case, NTLM, by itself, is not allowed (server authentication is based on Kerberos or PKI). |
| 9 | AllowFreshCredentials WhenNTLMOnly Meaning: If the only authentication is NTLM, and user authenticates with fresh credentials, allow the password to be passed to the listed targets. | Termsrv/* | |

In summary, the Cred SSP solution of the invention provides a more secure solution than in the past by providing a set of policies that can be used to control and restrict the delegation of user credentials from the client to the server. As the exemplary, non-limiting set of policies of Table III illustrate, the policies are designed to address a broad range of attacks, including malware running on the client's machine. Additionally, the Cred SSP of the invention includes a "secure by default" policy, which is the particular configuration via the policy settings that enables a client machine, by default, to mitigate a broad range of attacks. Furthermore, the set of policies of the invention are applicable for protection of any type of user credentials, including, but not limited to username/password, smartcard pin, one time passcodes (OTP), etc. The Cred SSP of the invention provides additional protection for the user's credentials because the calling application (of the Cred SSP API) on the server or client side is never given access to the user's clear text credentials, because only a trusted subsystem of the LSA has access to clear text credentials.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for delegating credentials from a client to a server in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for delegating credentials from a client to a server of the invention.

Figure 7A:
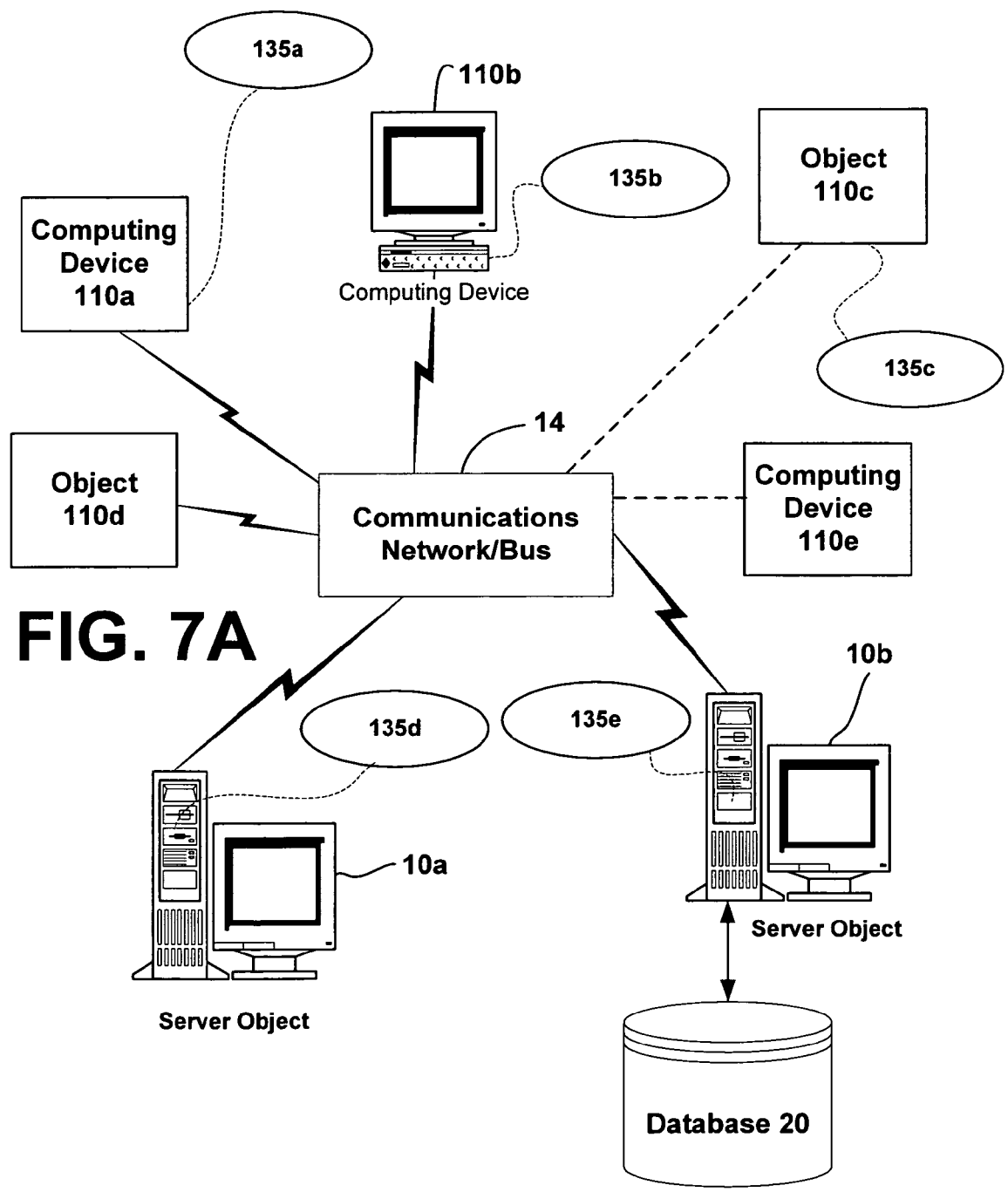
FIG. 7A is a block diagram representing an exemplary network environment in which the present invention may be implemented.

FIG. 7A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 7A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, suitable for use with the systems and methods for delegating credentials from a client to a server in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to delegating credentials from a client to a server according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed or utilized incident to program objects, such during the delegation of credentials from a client to a server in accordance with the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 7A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate the delegation of credentials from a client to a server in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for delegating credentials from a client to a server of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 7A illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to delegating user credentials to a server.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 7B:
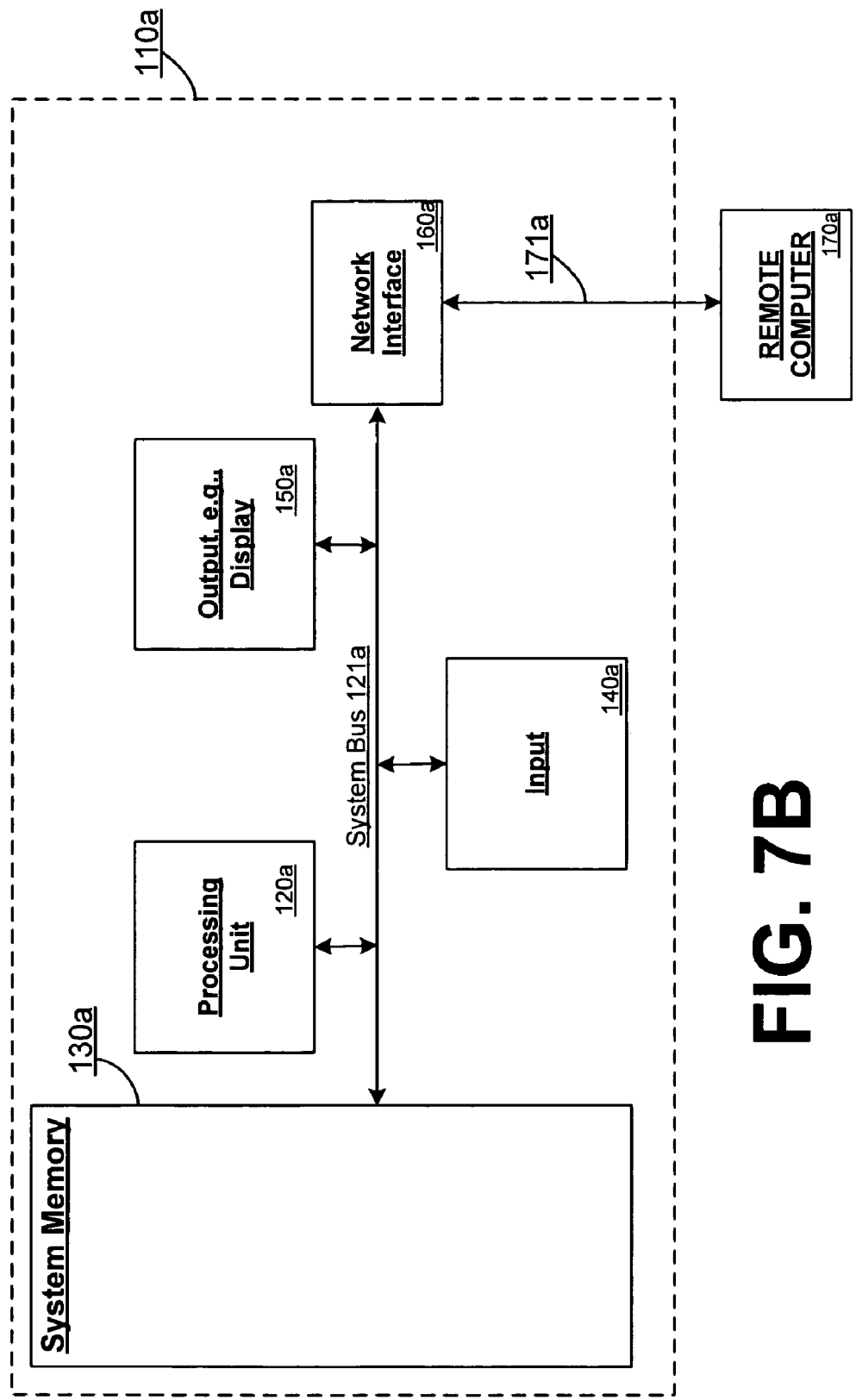
FIG. 7B is a block diagram representing an exemplary non-limiting computing system environment in which the present invention may be implemented.

As mentioned, the invention applies to any device wherein it may be desirable to shield a primary application from interference from secondary applications of the device. It should be understood, therefore, that handheld, portable and other computing devices and computing objects of all kinds are contemplated for use in connection with the present invention, i.e., anywhere that a device may wish to delegate credentials to a server (e.g., GSM network via a portable device such as a mobile phone). Accordingly, the below general purpose remote computer described below in FIG. 7B is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 7B thus illustrates an example of a suitable computing system environment 100a in which the invention may be implemented, although as made clear above, the computing system environment 100a is only one example of a suitable computing environment for a computing device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 7B, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

A user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have capabilities, such as media capabilities, different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 7B include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a network component (network card, modem, etc.) or other means for establishing communications over the WAN, such as the Internet. A means to connect to a network, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for delegating credentials from a client to a server in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for delegating credentials from a client to a server of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to delegate credentials from a client to a server. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the methods for delegating credentials from a client to a server of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for delegating credentials from a client to a server. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for delegating user credentials from a client to a server in a networked computing environment, comprising:
   sending a request from a client for at least one of an application, a service and a resource of a server in the networked computing environment that implicates delegation of user credentials from the client to the server;
   initiating a handshake between the client and the server, including receiving by the client a public key (Kpub) of the server;
   negotiating with the server to select an authentication package shared between the client and server to utilize as an authentication mechanism for authenticating communications between the client and the server;
   authenticating the server utilizing the selected authentication package as the authentication mechanism;
   determining whether authentication has occurred according to said authenticating step, and only when authentication has occurred, establishing a session between the client and server including establishing a shared secret for encryption of messages communicated between the client and server;
   receiving, on the client, an indication of a classification for the server;
   prior to transmitting the user credentials for the request, performing a policy check according to at least one pre-defined policy defined for user credentials to determine whether the server can be trusted with the user credentials, wherein the pre-defined policy is based on the received server classification;
   authenticating the Kpub of the server by:
     encrypting the Kpub with the shared secret;
     sending the encrypted Kpub to the server;
     receiving a response from the server; and
     verifying that the response includes (Kpub+1) encrypted with the shared secret; and
   if the server can be trusted according to the pre-defined policy and the response is verified, transmitting the user's credentials to the server to gain access to the at least one of the requested application, service and resource of the server from the client.

2. The method of claim 1, wherein the at least one pre-defined policy is a plurality of policies used to control and restrict the delegation of user credentials from a client to a server.

3. The method of claim 2, wherein the plurality of policies address mitigation of a broad range of attacks including at least one of Trojan or malware running on the client, default group policy settings and group policy values configurable by an administrator of the client, domain name service (DNS) poisoning to avoid resolution to a rogue server and denial of service attacks.

4. The method of claim 2, wherein the plurality of policies include policies that at least allow or deny delegation based on a list of service principal names (SPNs) of the server.

5. The method of claim 1, wherein the performing includes performing a policy check according to at least one pre-defined policy defined based on a type of the user credentials.

6. The method of claim 5, wherein the performing includes performing a policy check according to at least one pre-defined policy defined based on whether the user credentials are fresh, saved or default credentials.

7. The method of claim 1, wherein said transmitting of the user's credentials includes transmitting the user's credentials in a format that only a trusted subsystem of a local security system has access to the user credentials in clear text format.

8. The method of claim 7, wherein the performing of the policy check is performed by a local security authority (LSA) and the trusted subsystem is a trusted subsystem of the LSA.

9. The method of claim 1, further comprising:
after establishing the session between the client and server, authenticating a public key of the server.

10. The method of claim 1, wherein said steps are performed via a credential security support provider component made available to the client making the request via a security support provider interface (SSPI).

11. The method of claim 1, wherein the initial handshake is a handshake according to the secure sockets layer (SSL) or transport layer security (TLS) protocol.

12. The method of claim 1, wherein the negotiating includes negotiating using Simple and Protected Generic Security Service Application Program Interface (GSSAPI) Negotiation Mechanism (SPNEGO) negotiation.

13. The method of claim 1, wherein the selected authentication package a Kerberos or NT Local Area Network (LAN) Manager (NTLM).

14. The method of claim 1, wherein said shared secret is shared session key.

15. A client computing device, comprising:
a credential security support provider component for handling a request from the client computing device for at least one of an application, a service and a resource of a server in a networked computing environment, wherein the request implicates delegation of user credentials from the client computing device to the server;
wherein the credential security support provider component initiates a handshake between the client and the server, including receiving by the client a public key (Kpub) of the server, negotiates selection of a security support provider shared between the client and server to utilize as an authentication package for authenticating communications between the client and the server, and performs steps to authenticate the server and the client utilizing the authentication package; and
wherein, only after authentication has occurred, the credential security support provider component:
establishes a session between the client and server and a shared secret for encryption of messages communicated between the client and server according to the session, and upon receiving an indication of a classification for the server performs a policy check according to at least one pre-defined policy used to control and restrict the delegation of user credentials from the client computing device to the server, the policy check based on the received server classification; and
authenticates the Kpub of the server by:
encrypting the Kpub with the shared secret;
sending the encrypted Kpub to the server;
receiving a response from the server; and
verifying that the response includes (Kpub+1) encrypted with the shared secret; and
transmits the user's credentials to the server to gain access to the requested at least one of the application, the service and the resource of the server from the client only when the policy check is passed and the response is verified.

16. The client computing device of claim 15, wherein the credential security support provider component transmits the user's credentials in a format that a trusted subsystem of a local security authority (LSA) can decode to a clear text format.

17. The client computing device of claim 15, wherein the at least one pre-defined policy addresses mitigation of any one or more of a broad range of attacks including Trojan or malware running on the client, default group policy settings and group policy values configurable by an administrator of the client, domain name service (DNS) poisoning to avoid resolution to a rogue server, and denial of service attacks.

18. The client computing device of claim 15, wherein the at least one predefined policy includes a delegation policy based on whether the user credentials are fresh, saved or default credentials.

19. A computer implemented system delegating user credentials from a client to a server in a networked computing environment as part of a single sign on to a server's resources, the system comprising:
at least one processor; and
a memory, communicatively coupled to the at least one processor and containing instructions that, when executed by the at least one processor, perform a method, the method comprising:
sending a request from a client for at least one of an application, a service and a resource of a server in the networked computing environment that implicates delegation of user credentials from the client to the server;
initiating a handshake between the client and the server, including receiving by the client a public key (Kpub) of the server;
negotiating with the server to select an authentication package shared between the client and the server to utilize as an authentication mechanism for authenticating communications between the client and the server;
authenticating the server utilizing the selected authentication package as the authentication mechanism;
determining whether authentication has occurred according to said authenticating step, and only when authentication has occurred, establishing a session between the client and server including establishing a shared secret for encryption of messages communicated between the client and server;
receiving, on the client, an indication of a classification for the server;
prior to transmitting the user credentials for the request, performing a policy check according to at least one pre-defined policy defined for user credentials to determine whether the server can be trusted with the user credentials, wherein the pre-defined policy is based on the received server classification;
authenticating the Kpub of the server by:
encrypting the Kpub with the shared secret;
sending the encrypted Kpub to the server;
receiving a response from the server, and
verifying that the response includes (Kpub+1) encrypted with the shared secret; and
if the server can be trusted according to the pre-defined policy and the response is verified, transmitting the user's credentials to the server to gain access to the at least one of the requested application, service and resource of the server from the client.

* * * * *